United States Patent
Masui et al.

(10) Patent No.: US 11,072,328 B2
(45) Date of Patent: Jul. 27, 2021

(54) CONTROL-TARGET VEHICLE SETTING APPARATUS, CONTROL-TARGET VEHICLE SETTING SYSTEM, AND CONTROL-TARGET VEHICLE SETTING METHOD

(71) Applicants: DENSO CORPORATION, Kariya (JP); TOYOTA JIDOSHA KABUSHIKI KAISHA, Toyota (JP)

(72) Inventors: Yohei Masui, Kariya (JP); Takashi Maeda, Nagoya (JP); Naoki Kusumoto, Okazaki (JP); Yuki Tezuka, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 16/144,024

(22) Filed: Sep. 27, 2018

(65) Prior Publication Data
US 2019/0092329 A1 Mar. 28, 2019

(30) Foreign Application Priority Data
Sep. 28, 2017 (JP) .............................. JP2017-187657

(51) Int. Cl.
*B60W 30/165* (2020.01)
*G05D 1/02* (2020.01)
*G06K 9/00* (2006.01)

(52) U.S. Cl.
CPC ......... *B60W 30/165* (2013.01); *G05D 1/0223* (2013.01); *G06K 9/00805* (2013.01);
(Continued)

(58) Field of Classification Search
CPC ............... B60W 30/165; B60W 30/16; B60W 2554/801; B60W 2554/80;
(Continued)

(56) References Cited

U.S. PATENT DOCUMENTS

2016/0362106 A1* 12/2016 Maeda ............ B60W 30/18145

FOREIGN PATENT DOCUMENTS

| JP | 2003-154870 A | 5/2003 |
| JP | 2003-200754 A | 7/2003 |

(Continued)

*Primary Examiner* — Muhammad Shafi
(74) *Attorney, Agent, or Firm* — Maschoff Brennan

(57) ABSTRACT

A control-target vehicle setting apparatus sets a control-target vehicle that serves as a target for driving assistance control. The control-target vehicle setting apparatus includes a detection signal acquiring unit and a setting control unit. The detection signal acquiring unit acquires a first detection signal that indicates a target by an image and a second detection signal that indicates a target by a reflection point. The setting control unit sets an acquired forward target as the control-target vehicle when the forward target is associated with an integration history that indicates that the forward target has been determined to be a vehicle using the first detection signal and the second detection signal in an integrated manner, even when the forward target is not associated with a movement history that indicates that the forward target has been detected as being a moving object.

14 Claims, 6 Drawing Sheets

(52) U.S. Cl.
CPC ... *G06K 9/00825* (2013.01); *B60W 2554/801* (2020.02); *G05D 2201/0213* (2013.01)

(58) Field of Classification Search
CPC .......... B60W 2554/00; G06K 9/00805; G06K 9/00825; G05D 1/0223; G05D 2201/0213; G01S 2013/9321; G01S 2013/932; G01S 2013/93271; G01S 2013/9324; G01S 13/589; G01S 2013/9325; G01S 2013/9323; G01S 13/72; G01S 13/867; G01S 13/931
USPC .......................................................... 701/96
See application file for complete search history.

(56) References Cited

FOREIGN PATENT DOCUMENTS

| | | | |
|---|---|---|---|
| JP | 2005-145396 | * | 6/2005 |
| JP | 2005-145396 A | | 6/2005 |

\* cited by examiner

CONTROL-TARGET VEHICLE SETTING APPARATUS, CONTROL-TARGET VEHICLE SETTING SYSTEM, AND CONTROL-TARGET VEHICLE SETTING METHOD

CROSS-REFERENCE TO RELATED APPLICATION

This application is based on and claims the benefit of priority from earlier Japanese Patent Application No. 2017-187657, filed Sep. 28, 2017, the description of which is incorporated herein by reference.

BACKGROUND

Technical Field

The present disclosure relates to a technology for setting a control-target vehicle that serves as a target for driving assistance control of an own vehicle.

Related Art

A vehicle driving assistance apparatus has been proposed (for example, refer to JP-A-2005-145396). The vehicle driving assistance apparatus performs driving assistance to enable an own vehicle (to which the vehicle driving apparatus is mounted) to follow a preceding vehicle (set as a control-target vehicle being a target for driving assistance control of an one vehicle) using both an imaging unit and a radar unit.

However, in cases in which a stationary object of which movement has not been detected since the start of execution of driving assistance is set as a target for driving assistance control, an issue arises in that differentiation between a stationary vehicle that is stopped and a stationary object other than a vehicle that is present on a travel locus (trajectory) on which an own vehicle is driving is difficult.

Here, for example, a stationary object other than a vehicle includes stationary objects on a driving road such as a manhole in a road, and upper objects (overhead objects or high objects) such as signs and markers positioned above the travel locus. In addition, an issue also arises in that, when accuracy of the differentiation between a stationary vehicle and a stationary object other than a vehicle is low, driving assistance cannot be appropriately performed.

SUMMARY

It is thus desired to provide a technology for enabling accurate differentiation between a stationary vehicle and a stationary object other than a vehicle, and appropriate setting of a control-target vehicle that serves as a target for driving assistance control performed in an own vehicle.

The present disclosure may be implemented by the following exemplary embodiments.

A first exemplary embodiment provides a control-target vehicle setting apparatus that sets a control-target vehicle that serves as a target for driving assistance control. The control-target vehicle setting apparatus includes: a detection signal acquiring unit that acquires a first detection signal that indicates a target by an image and a second detection signal that indicates a target by a reflection point; and a setting control unit that sets a forward target as the control-target vehicle when the forward target is associated with an integration history that indicates that the forward target has been determined to be a vehicle using the first detection signal and the second detection signal in an integrated manner, even when the forward target is not associated with a movement history that indicates that the forward target has been detected as being a moving object.

As a result of the control-target vehicle setting apparatus of the first exemplary embodiment, a stationary vehicle and a stationary object other than a vehicle can be accurately differentiated, and the control-target vehicle can be appropriately set.

A second exemplary embodiment provides a control-target vehicle setting method for setting a control-target vehicle that is a target of driving assistance control. The control-target vehicle setting method includes: acquiring a first detection signal that indicates a target by an image and a second detection signal that indicates a target by a reflection point; and setting a forward target as the control-target vehicle when the forward target is associated with an integration history that indicates that the forward target has been determined to be a vehicle using the first detection signal and the second detection signal in an integrated manner, even when the forward target is not associated with a movement history that indicates that the forward target has been detected as being a moving object.

As a result of the control-target vehicle setting method of the second exemplary embodiment, a stationary vehicle and a stationary object other than a vehicle can be accurately differentiated, and the control-target vehicle can be appropriately set. The present disclosure may also be implemented as a control-target vehicle setting program or a computer-readable recording medium on which the program is recorded.

DESCRIPTION OF THE EMBODIMENTS

A control-target vehicle setting apparatus, a control-target vehicle setting system, and a control-target vehicle setting method according to several embodiments of the present disclosure will hereinafter be described.

First Embodiment

Figure 1:
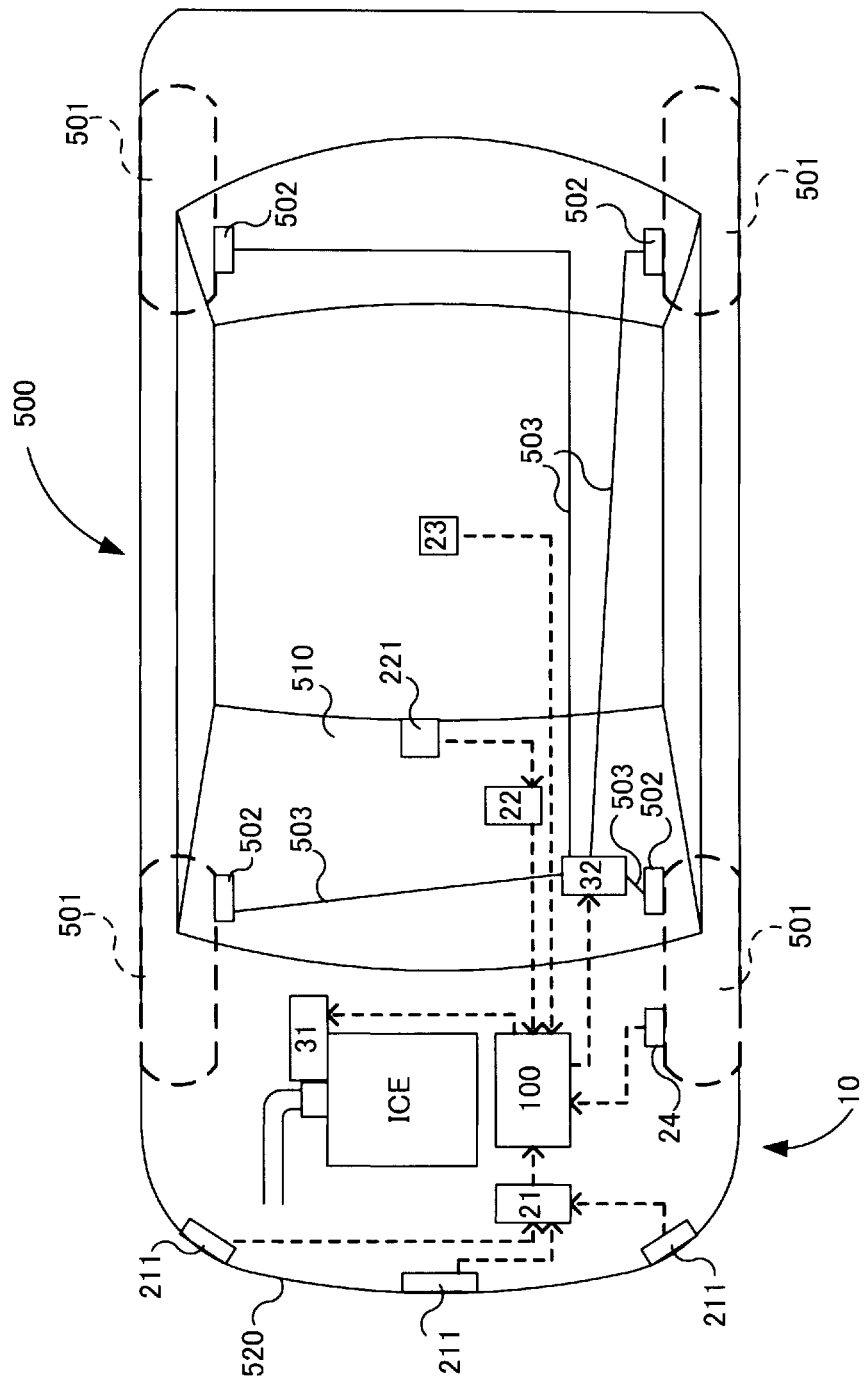
FIG. 1 is an explanatory diagram of a vehicle to which a control-target vehicle setting apparatus according to a first embodiment is mounted.

As shown in FIG. 1, a control-target vehicle setting apparatus 10 according to a first embodiment is used so as to be mounted to a vehicle 500. The control-target vehicle setting apparatus 10 is merely required to include at least a control apparatus 100. A control-target vehicle setting system includes, in addition to the control-target vehicle setting apparatus 10, a radar electronic control unit (ECU) 21, a camera ECU 22, a yaw rate sensor 23, a wheel speed sensor 24, a throttle driving apparatus 31, and a brake assistance apparatus 32. The vehicle 500 includes an internal combustion engine (ICE), wheels 501, a brake apparatus 502, a brake line 503, a front windshield 510, and a front bumper 520.

The radar ECU 21 is connected to a millimeter-wave radar 211 that emits radio waves and detects reflected waves from a target (object). The radar ECU 21 generates a detection signal that indicates a target by a reflection point using the reflected wave acquired by the millimeter-wave radar 21. The radar ECU 21 then outputs the detection signal. The camera ECU 22 is connected to a front camera 221. The camera ECU 22 generates a detection signal that indicates a target by an image using an image acquired by the front camera 221 and shape patterns of targets that are prepared in advance. The camera ECU 22 then outputs the detection signal. Each of the radar ECU 21 and the camera ECU 22 is a microprocessor that includes a calculating unit, a storing unit, and an input/output unit.

The radar ECU 21 and the millimeter-wave radar 211 correspond to a first detecting unit. The camera ECU 22 and the front camera 221 correspond to a second detecting unit. In addition to the millimeter-wave radar 211, a laser radar (LIDAR) or an ultrasonic wave detector may be used as a detector that detects the reflected waves. The ultrasonic wave detector emits sound waves and detects the reflected waves of the sound waves. In addition to the front camera 221, a stereo camera or a multi-camera (multiple cameras) may be used as an imaging apparatus that captures an image of the target. The stereo camera is composed of two or more cameras.

In the vehicle 500, the internal combustion engine ICE is provided with the throttle driving apparatus 31. The throttle driving apparatus 31 drives a throttle valve that adjusts the amount of intake air and controls output of the internal combustion engine ICE. In the vehicle 500, each wheel 501 is provided with the brake apparatus 502.

The brake apparatus 502 implements braking of the corresponding wheel 501 through hydraulic pressure of a brake fluid that is supplied through the brake line 503 based on operation of a brake pedal by a driver. The brake line 503 includes a brake piston and a brake fluid line. The brake piston generates hydraulic pressure of the brake fluid based on the brake pedal operation. According to the present embodiment, the brake assistance apparatus 32 is provided on the brake line 503. The brake assistance apparatus 32 performs hydraulic control independent of the brake pedal operation and thereby implements brake assistance.

A configuration in which a control signal line is provided instead of the brake fluid line and an actuator that is provided for each brake apparatus 502 is operated may be used as the brake line 503. As a result of the throttle driving apparatus 31 and the brake assistance apparatus 32, a constant-speed driving and inter-vehicle distance control process, that is, adaptive cruise control (ACC) is implemented as driving assistance control. In the constant-speed driving and inter-vehicle distance control process, an own vehicle (to which control-target vehicle setting apparatus 10 is mounted) is controlled so as to drive at a preset vehicle speed while maintaining an inter-vehicle distance between a preceding vehicle and the own vehicle at a fixed distance.

In addition to the constant-speed driving and inter-vehicle distance control process, driving assistance includes steering assistance in which steering control of a steering mechanism is performed independent of operation of a steering wheel by the driver. The steering mechanism includes the steering wheel and a steering rod (not shown). Such operations may be controlled by a driving assistance apparatus that incorporates the functions of the brake assistance apparatus.

Figure 2:
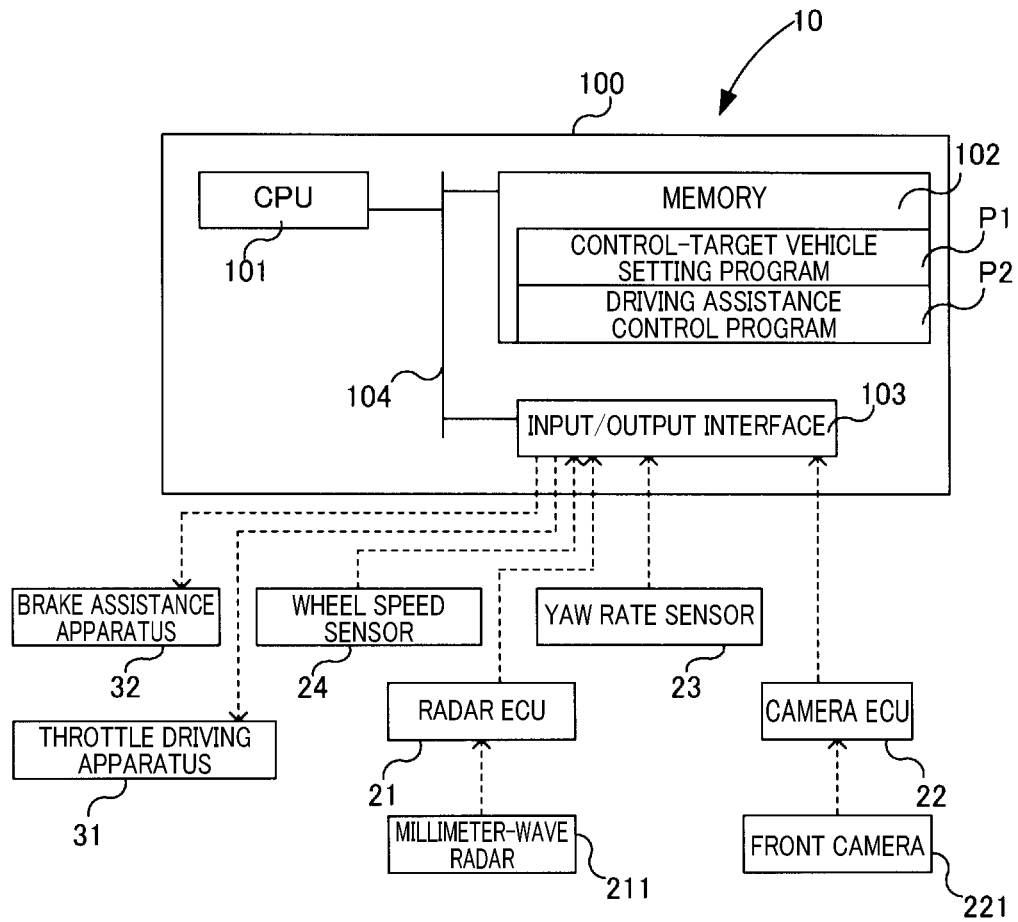
FIG. 2 is a block diagram of a functional configuration of a control apparatus included in the control-target vehicle setting apparatus according to the first embodiment.

As shown in FIG. 2, the control apparatus 100 includes a central processing unit (CPU) 101, a memory 102, an input/output interface 103, and a bus 104. The CPU 101, the memory 102, and the input/output interface 103 are connected by the bus 104 so as to be capable of two-way communication.

The memory 102 includes a memory, such as a read-only memory (ROM), that non-volatilely stores a control-target vehicle setting program P1 and a driving assistance control program P2 in a read-only manner. The control-target vehicle setting program P1 is used to set a control-target vehicle (target preceding vehicle) that is a target for driving assistance control of the own vehicle. The driving assistance control program P2 is used to perform the driving assistance control. The memory 102 also includes a memory, such as a random access memory (RAM), that is readable and writable by the CPU 101. Furthermore, the memory 102 may also store therein a flag that indicates whether or not a movement history is present and a flag that indicates whether or not a fusion (FSN) history is present. The flags will be described hereafter.

The CPU 101 functions as a setting control unit by opening the control-target vehicle setting program P1 stored in the memory 102 in a read-write memory and running the program. In a similar manner, the CPU 101 functions as a driving assistance control unit by running the driving assistance control program P2. The CPU 101 may be a single CPU. Alternatively, the CPU 101 may be a plurality of CPUs that each run a program. Still alternatively, the CPU 101 may be a multi-thread CPU that simultaneously runs a plurality of programs.

The radar ECU 21, the camera ECU 22, the yaw rate sensor 23, the wheel speed sensors 24, the throttle driving apparatus 31, and the brake assistance apparatus 32 are each connected to the input/output interface 103 by a control signal line.

The detection signals are inputted from the radar ECU 21, the camera ECU 22, the yaw rate sensor 23, and the wheel speed sensors 24. A control signal that designates a throttle valve opening is outputted to the throttle driving apparatus 31. A control signal that designates a brake level is outputted to the brake assistance apparatus 32. The input/output interface 103 may be referred to as a detection signal acquiring unit that acquires a first detection signal and a second detection signal.

The millimeter-wave radar 211 is a sensor that detects a distance to a target, as well as a relative speed and an angle of the target, by emitting millimeter waves and receiving reflected waves reflected by the target. According to the present embodiment, the millimeter-wave radar 211 is arranged in each of a center portion and both side surfaces of the front bumper 520.

An unprocessed detection signal that is outputted from the millimeter-wave radar 211 is processed by the radar ECU 21 and inputted to the control apparatus 100 as the first detection signal. The first detection signal is composed of a point that indicates a single representative position of the target or a series of points that indicate a plurality of representative positions of the target. Alternatively, the radar ECU 21 may not be provided. In this case, a signal indicating an unprocessed reception wave is inputted to the control apparatus 100 from the millimeter-wave radar 211 as the first detection signal. In cases in which the unprocessed reception wave is used as the detection signal, the control apparatus 100 performs signal processing to identify the position and the distance of the target.

The front camera 221 is an imaging apparatus that includes a single image sensor, such as a charge-coupled device (CCD) image sensor. The front camera 221 is a sensor that outputs outer-shape information of a target as image data that serves a detection result by receiving visible light.

The camera ECU 22 performs a feature-point extraction process on the image data outputted from the front camera 221. The camera ECU 22 performs a comparison between a pattern formed by extracted feature points and a comparison pattern that indicates an outer shape of a target to be set as a target for driving assistance control, that is, a vehicle. The comparison pattern is prepared in advance. When the extracted pattern and the comparison pattern match or are similar, the camera ECU 22 generates a frame image that includes the determined target. Meanwhile, when the extracted pattern and the comparison pattern do not match or are not similar, that is, when the extracted pattern and the comparison pattern are dissimilar, the camera ECU 22 does not generate a frame image.

When a plurality of targets are included in the image data, the camera ECU 22 generates a plurality of frame images that each include a determined target. The frame images are then inputted to the control apparatus 100 as the second detection signal. Each frame image is expressed by pixel data and includes positional information, that is, coordinate information of the determined target.

The number of frame images that can be included in the detection signal depends on a bandwidth between the camera ECU 22 and the control apparatus 100. The camera ECU 22 may not be separately provided. Unprocessed image data picked up by the front camera 221 may be inputted to the control apparatus 100 as the second detection signal. In this case, the control apparatus 100 may perform determination of the target using the outer-shape pattern of the target.

According to the present embodiment, the front camera 22 is arranged in an upper center portion of the front windshield 510. The pixel data outputted from the front camera 22 is monochromatic pixel data or color pixel data. When a target other than a vehicle is desired as the target to be set as the control target, an outer-shape pattern for the desired target may be prepared. The camera ECU 22 may then output a frame image that includes the desired target as the detection signal. In this case, in a process performed by the control apparatus 100 at a later stage, the frame image appropriate for the process may be selectively used.

The yaw rate sensor 23 is a sensor that detects a rotation angle velocity of the vehicle 500. For example, the yaw rate sensor 23 is arranged in a center portion of the vehicle 500. The detection signal outputted from the yaw rate sensor 23 is a voltage value that is proportional to a rotation direction and an angular velocity.

The wheel speed sensor 24 is a sensor that detects a rotation speed of the wheel 501. The wheel speed sensor 24 is provided for each wheel 501. An output signal outputted from the wheel speed sensor 24 is a voltage value that is proportional to the wheel speed or a pulse wave of which the interval is based on the wheel speed. As a result of the detection signal from the wheel speed sensor 24 being used, information such as a vehicle speed of the own vehicle and a traveling distance of the own vehicle can be acquired.

The throttle driving apparatus 31 is an actuator that adjusts an opening of the throttle valve based on operation of an accelerator pedal by the driver or regardless of the operation of the accelerator pedal by the driver, and controls the output of the internal combustion engine ICE. For example, the throttle driving apparatus 31 is a stepper motor. A driver that controls the operation of the actuator based on a control signal from the CPU 101 is mounted in the throttle driving apparatus 31. According to the present embodiment, the throttle driving apparatus 31 is provided in an intake manifold. The throttle driving apparatus 31 increases and decreases the amount of air drawn into the internal combustion engine ICE based on the control signal from the control apparatus 100.

The brake assistance apparatus 32 is an actuator that implements braking by the brake apparatus 502 regardless of the operation of the brake pedal by the driver. A driver that controls the operation of the actuator based on a control signal from the CPU 101 is mounted in the brake assistance apparatus 32. According to the present embodiment, the brake assistance apparatus 32 is provided on the brake line 503. The brake assistance apparatus 32 increases and decreases hydraulic pressure in the brake line 503 based on the control signal from the control apparatus 100. For example, the brake assistance apparatus 32 is composed of a module that includes an electric motor and a hydraulic piston that is driven by the electric motor. Alternatively, a brake control actuator that is already incorporated as a lateral-sliding prevention apparatus or an anti-lock brake system may be used.

A control-target vehicle setting process and a driving assistance control process performed by the control-target vehicle setting apparatus 10 according to the first embodiment will be described.

Figure 3:
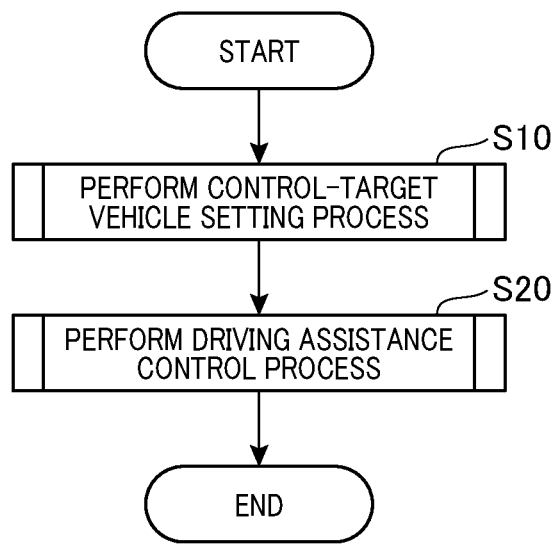
FIG. 3 is a flowchart of a processing flow of a control-target vehicle setting process and a driving assistance control process performed by the control-target vehicle setting apparatus according to the first embodiment.

For example, a processing routine shown in FIG. 3 is repeatedly performed at a predetermined time interval from when the control system of the vehicle is started until the control system is stopped, or from when a start switch is turned on until the start switch is turned off. A control-target vehicle setting process (step S10) is performed by the CPU 101 running the control-target vehicle setting program P1. A driving assistance control process (step S20) is performed by the CPU 101 running the driving assistance control program P2.

In FIG. 3, the control-target vehicle setting process (step S10) and the driving assistance control process (step S20) are included in a same processing flow to facilitate description. However, the control-target vehicle setting process (step S10) and the driving assistance control process (step S20) can be independently performed at differing timings.

For example, the driving assistance control process (step S20) includes the constant-speed driving and inter-vehicle distance control process, a brake assistance process, and a steering assistance process. The brake assistance process includes sudden braking and gradual braking to prevent collision with the control-target vehicle. The steering assistance process includes steering to prevent collision with the control-target vehicle and steering to prevent deviation from a traffic lane.

Details of the control-target vehicle setting process (step S10) according to the first embodiment will be described with reference to FIG. 4 and FIG. 5. The flowchart shown in FIG. 4 is repeatedly performed at a predetermined time interval.

Figure 4:
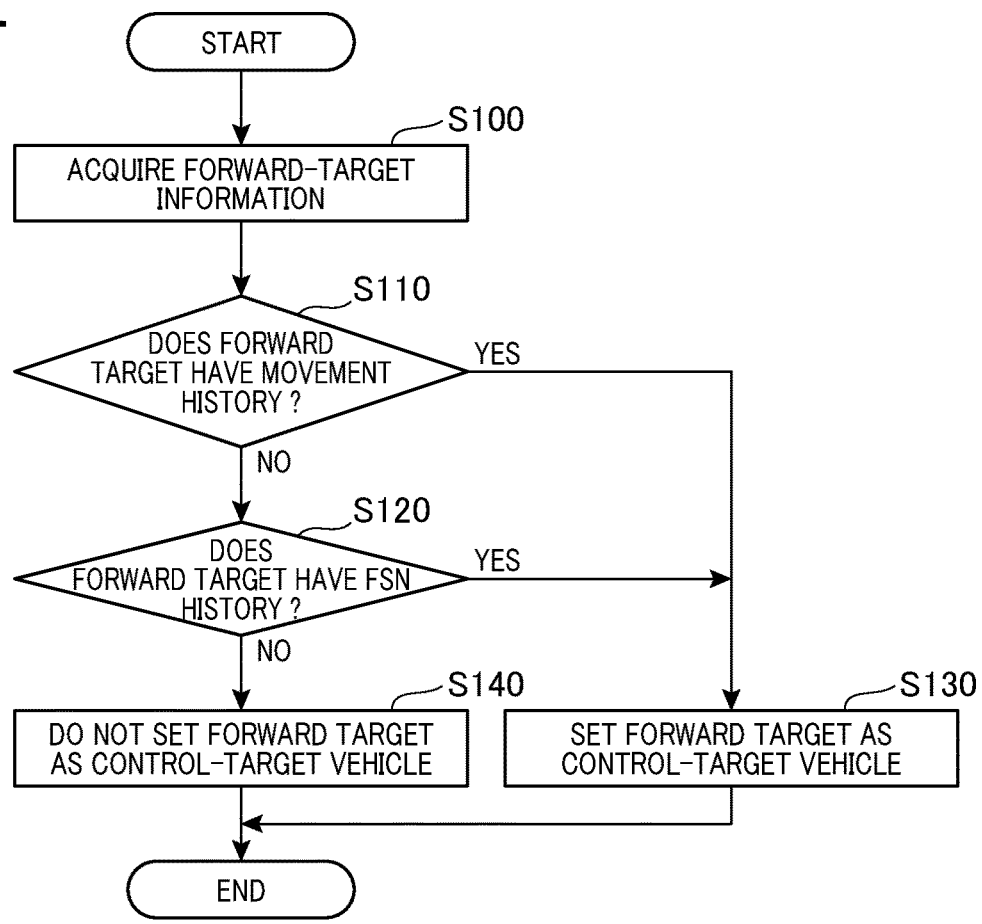
FIG. 4 is a flowchart of a processing flow of the control-target vehicle setting process according to the first embodiment.

As shown in FIG. 4, the CPU 101 acquires attribute information (forward-target information) of a forward target (target ahead) using the radar ECU 21 and the camera ECU 22 (step S100). The attribute information includes the relative speed, reflected-power strength, position coordinates, and direction of the forward target. The forward target is a target to be subjected to determination and therefore may be referred to as a determination target.

The CPU 101 determines whether or not the target detected by the millimeter-wave radar 211 has moved, every time the information on the forward target is acquired. The CPU 101 associates the detected target with a movement history that indicates whether or not the target has moved.

Specifically, after the start of an initial execution of the present processing routine, the CPU 101 determines whether or not a target that has been initially detected by the millimeter-wave radar 211 has moved based on whether or not the relative speed or the position coordinates of the reflection point corresponding to the target has changed at each acquisition timing.

For example, when determined that the target is moving, the CPU 101 associates the target with a movement-history present flag that indicates that the target is a moving object. When determined that the target is not moving, the CPU 101 associates the target with a movement-history absent flag that indicates that the target is a stationary object.

Furthermore, the CPU 101 performs a data fusion process that improves determination accuracy regarding whether or not the target is a vehicle using the detection signal inputted from the radar ECU 21 and the detection signal inputted from the camera ECU 22. That is, the CPU 101 performs a data integration process or combining process.

Specifically, the CPU 101 performs integration when the position coordinates of each reflection point indicating the target inputted from the radar ECU 21 correspond to the detection signal inputted from the camera ECU 22, that is, the determined position coordinates of the vehicle included in the image frame. The CPU 101 associates the target with a fusion (FSN)-history present flag, that is, an integration-history present flag that indicates that the target is determined to be a vehicle.

Meanwhile, when determined that a vehicle corresponding to the position coordinates of each reflection point indicating the target does not appear in the image frame and correspondence cannot be established, the CPU 101 associates the target with An FSN-history absent flag. The target being associated with the FSN-history present flag means that the target is a stationary vehicle that is determined to be a vehicle through vehicle determination by pattern matching. The target being associated with the FSN-history absent flag means that the target is an undetermined stationary target of which the type of the target is unidentified.

A plurality of forward targets may be present. A plurality of targets may be included in the detection signals inputted from the radar ECU 21 and the camera ECU 22. Therefore, the data fusion process is performed for each target.

The detection of a target using the millimeter-wave radar 211 is not easily affected by forward obstacles, the weather, and the like. Therefore, even when a target is detected by the millimeter-wave radar 211, the detection of the target by the front camera 211 may not be possible. In such cases, the data fusion process cannot be performed. The movement history flag and the FSN history flag are initialized, that is, reset to indicate movement-history absent and FSN-history absent every time the system in the vehicle 500 is started.

The CPU 101 determines whether or not the forward target of which the information has been acquired at step S100 is associated with the movement-history present flag (step S110). When determined that the forward target is associated with the movement-history present flag (Yes at S110), the CPU 101 sets the forward target as the control-target vehicle (step S130). The CPU 101 then ends the present processing routine. The forward target that is set as the control-target vehicle is associated with a mark that indicates that the target is the control-target vehicle. This association is recorded in the memory 102.

When determined that the forward target is not associated with the movement-history present flag (No at step S110), the CPU 101 determines whether or not the forward target is associated with the FSN-history present flag (step S120). When determined that the forward target is associated with the FSN-history present flag (Yes at step S120), the CPU 101 sets the forward target as the control-target vehicle (step S130). The CPU 101 then ends the present processing routine.

When determined that the forward target is not associated with the FSN-history present flag (No at step S120), the CPU 101 does not set the forward target as the control-target vehicle (step S140). The CPU 101 then ends the present processing routine.

Figure 5:
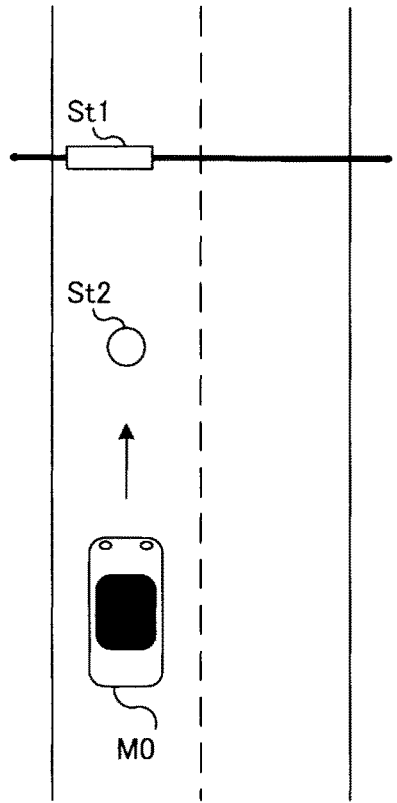
FIG. 5 is an explanatory diagram of a relationship between an own vehicle and a stationary object on a driving road.

In the example shown in FIG. 5, stationary targets that are not vehicles, such as a sign or marker that is an upper object (an overhead object or a high object) St1 present above a driving road (i.e., a travel locus) on which an own vehicle M0 is driving and a manhole that is an on-road stationary object St2 are not determined to be vehicles even in the pattern matching process performed on the captured image data by the camera ECU 22.

Therefore, the camera ECU 22 does not output the image frames including these stationary targets as the detection signal. The CPU 101 cannot perform the data fusion process. As a result, these stationary targets are not associated with the FSN-history present flag and are not set as the control-target vehicle.

As a result of the control-target vehicle setting apparatus 10 according to the first embodiment, even a target that has no movement history, that is, a stationary object can be determined to be a vehicle through pattern matching using the image data picked up by the front camera 221. In cases in which the target is associated with the FSN-history present flag, the target can be determined to be a stationary vehicle and set as the control-target vehicle.

Therefore, a stationary vehicle and a stationary forward target that is other than a vehicle can be accurately differentiated. The control-target vehicle can be appropriately set. That is, a stationary vehicle that is conventionally difficult to differentiate from an upper object or an on-road stationary object present on the travel locus can be set as the control-target vehicle. As a result, the driving assistance control can be performed under more conditions. The accuracy of driving assistance can be improved.

According to the first embodiment, the process for setting the control-target vehicle at step S130 more specifically includes a step of determining a plurality of control-target vehicle candidates and a step of setting a single control-target vehicle candidate among the plurality of control-target vehicle candidates as the control-target vehicle. That is, when a plurality of forward targets are present and the plurality of forward targets have the movement history or the FSN history, a plurality of control-target vehicle candidates may be determined.

For example, the setting of a single control-target vehicle is performed under a condition that the control-target vehicle candidate is closest in distance to the own vehicle and has the highest relative speed in relation to the own vehicle, among the plurality of control-target vehicle candidates. The forward target that is the set control-target vehicle candidate is associated with a mark that indicates that the forward target is the control-target vehicle. This processing detail can be similarly applied to embodiments described below.

Second Embodiment

A control-target vehicle setting process according to a second embodiment that is performed by the control-target vehicle setting apparatus 10 will be described with reference to FIG. 6 to FIG. 9.

Figure 6:
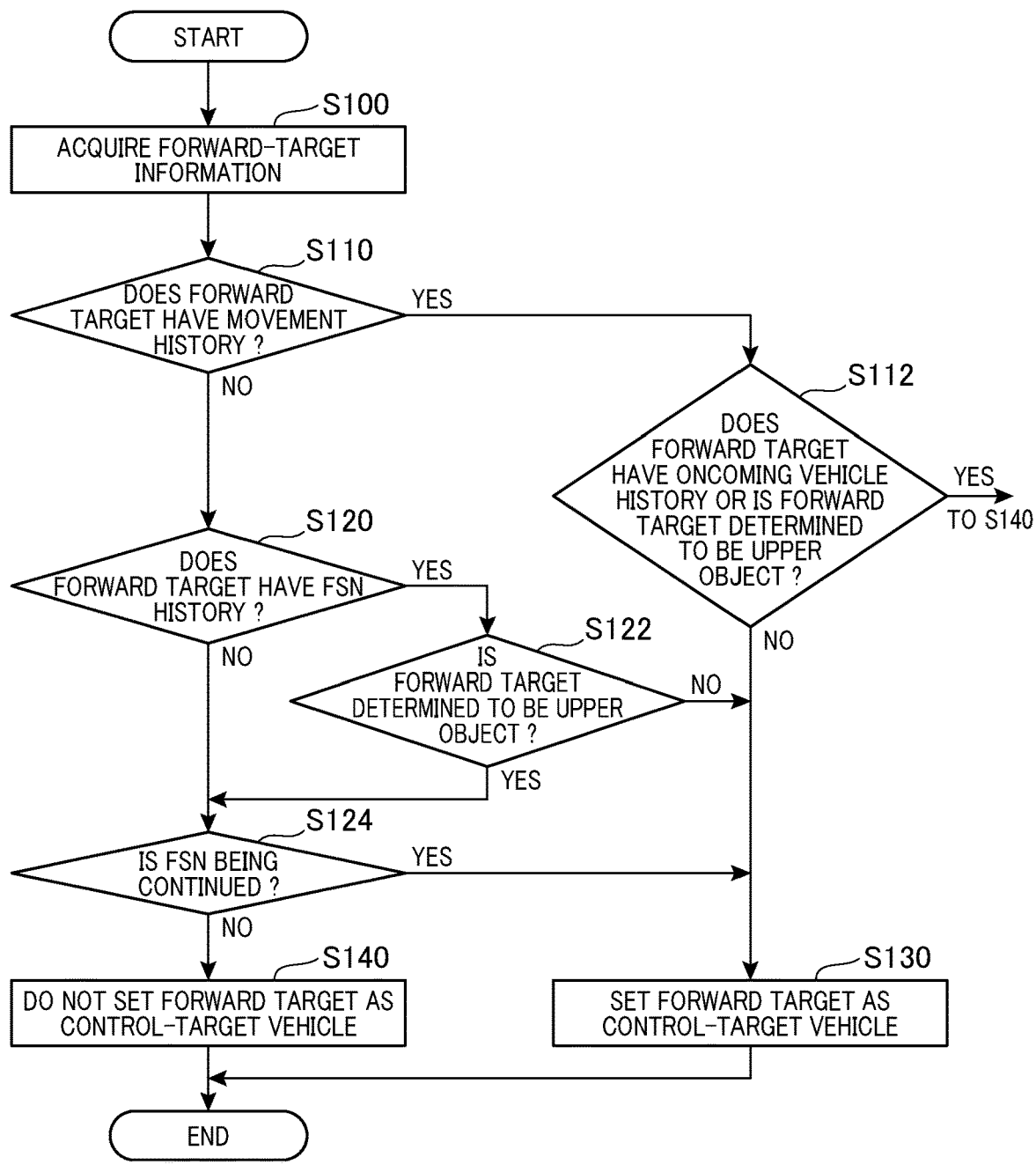
FIG. 6 is a flowchart of a processing flow of a control-target vehicle setting process according to a second embodiment.

The configurations of the vehicle 500, the control-target vehicle setting apparatus 10, and the control-target vehicle setting system are similar to the configurations according to the first embodiment. Therefore, the configurations are given the same reference numbers. Descriptions thereof are omitted. In addition, processing steps similar to those of the control-target vehicle setting process according to the first embodiment are given the same step numbers. Descriptions thereof are omitted. The process in the flowchart shown in FIG. 6 is also repeatedly performed at a predetermined time interval.

The CPU 101 performs step S100 and step S110. According to the second embodiment, at step S100, the CPU 101 performs an oncoming-vehicle determination process and an upper-object determination process. For example, in the oncoming-vehicle determination process, the CPU 101 can determine that the forward target is a moving vehicle that is advancing in a direction opposite the direction of the own vehicle using relative speed. When the distance in a lateral direction between the forward target and the own vehicle is greater than a distance prescribed in advance, the CPU 101 can determine that the forward target is an oncoming vehicle. When determined that the forward target is an oncoming vehicle, the CPU 101 associates the forward target with an oncoming-vehicle-history present flag that indicates that the forward target is determined to be an oncoming vehicle.

For example, in the upper-object determination process, the CPU 101 can determine whether or not the forward target is an upper object based on the distance and the relative speed between the upper object that is the forward target and the own vehicle.

Figure 7:
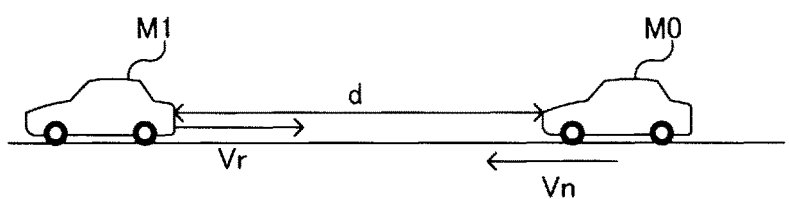
FIG. 7 is an explanatory diagram of a relationship between the own vehicle and another vehicle serving as a forward target.

As shown in FIG. 7, a relationship Vr=−Vn is established between a relative distance Vr of a forward target MI that is present at a distance d in a horizontal direction on the travel locus on which the own vehicle M0 is driving and a speed Vn of the own vehicle M0. When |Vr|=Vn, the forward target is a stationary object. When |Vr|>Vn, the forward target is an oncoming object (opposing object). When |Vr|<Vn, the forward target is a separating object that is moving away from the own vehicle.

Figure 8:
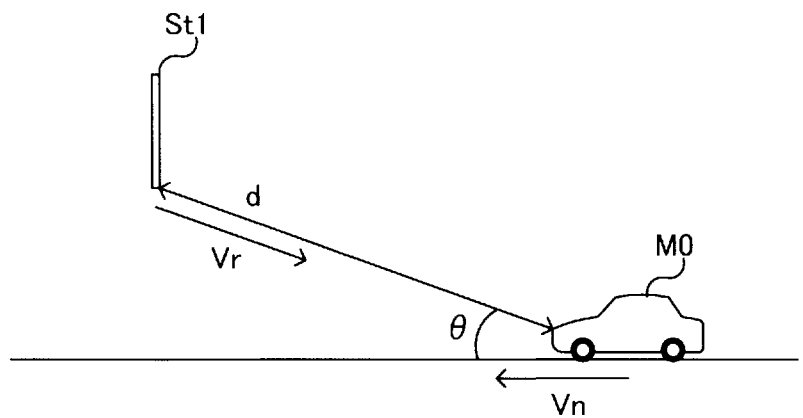
FIG. 8 is an explanatory diagram of a relationship between the own vehicle and an upper object serving as a forward target.

Meanwhile, as shown in FIG. 8, a relationship Vr=−Vn× cos θ is established between the relative speed Vr of the upper object St1 serving as the forward target that is present at a distance d obliquely above the driving road locus of the own vehicle M0 and the speed Vn of the own vehicle M0. Here, θ denotes an elevation angle. Therefore, compared to cases in which the forward target is a target that is preset in the horizontal direction, an absolute speed difference of Verr=Vn×(1−cos θ) is present.

Figure 9:
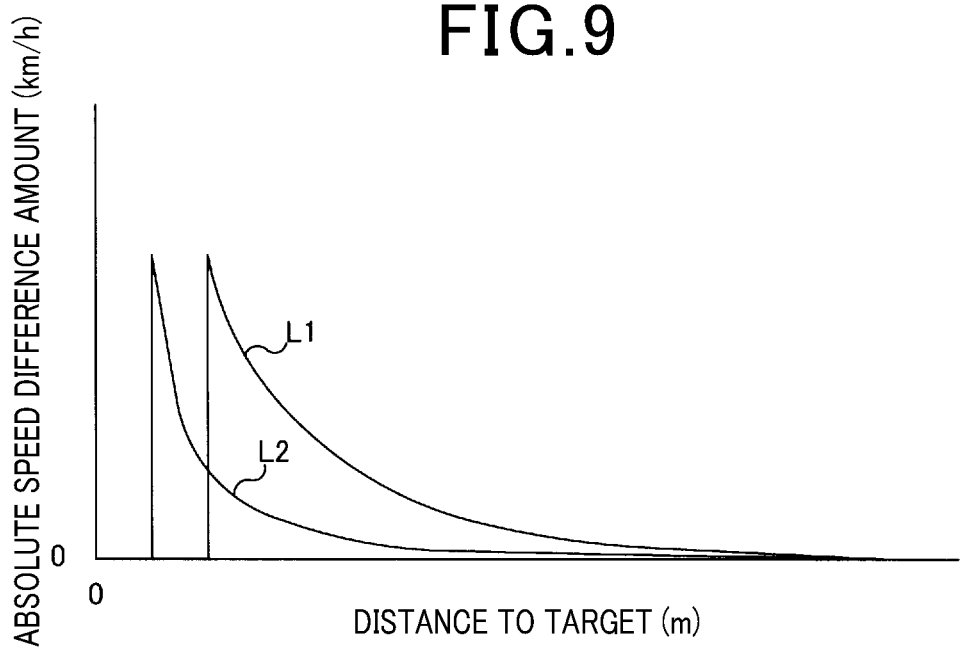
FIG. 9 is an explanatory diagram of a relationship between distance and absolute speed difference between a forward target and the own vehicle.

As shown in FIG. 9, the absolute speed difference Verr increases when θ increases, that is, when the height of the upper object St1 increases and when the distance d between the own vehicle M0 and the upper object St1 decreases.

In FIG. 9, the height of the upper object St1 corresponding to a characteristics line L1 is higher than the height of the upper object St1 corresponding to a characteristics line L2. When the distance d between the upper object St1 and the own vehicle M0 decreases, the upper object St1 falls outside of the elevation angle of the millimeter-wave radar 211. Therefore, the absolute speed difference Verr becomes 0 km/h from a certain distance. As a result, a forward target of which the absolute speed difference Verr increases as the distance d to the own vehicle M0 decreases can be determined to be an upper object.

When determined that the forward target is an upper object, the CPU 101 associates the forward target with an upper object determination flag that indicates that the forward target is determined to be an upper object. The upper-object determination flag is updated every time the determination regarding the upper object is performed.

When the relative speed between the forward target and the own vehicle M0 increases after the forward target is determined to be an upper object, the CPU 101 may determine that the forward target is not an upper object. For example, the reflected wave from an upper end of a freight vehicle that has a high vehicle height and is driving at a low speed may be detected as a reflected wave from an upper object. In this case, the forward target is preferably set as the control-target vehicle.

In the upper-object determination process, in addition to or instead of the distance and the relative speed between the upper object that is the forward target and the own vehicle, reflected power or an amount of change in reflected power may be used to determine whether or not the forward target is an upper object.

Compared to when the forward target is positioned ahead in the horizontal direction, when the forward target is an upper object, the reflected power decreases as the distance between the forward target and the own vehicle decreases. Therefore, whether or not the forward target is an upper object can be determine based on the power of the reflected wave becoming equal to or less than a reference value, or the reflected power changing in a decreasing manner.

Furthermore, in addition to or instead of the determination using the millimeter-wave radar 211, a determination by pattern matching may be performed using the image data picked up by the front camera 221 and preparing a comparison pattern for the upper object St1. For example, this process can be implemented by a rectangular pattern positioned ahead and above being prepared as the comparison pattern.

In general, when the distance d between the upper object St1 that is the forward target and the own vehicle M0 is long, that is, the elevation angle θ is small, the upper object tends to be recognized as the forward target that is present in the horizontal direction of the own vehicle M0. Therefore, in cases in which the millimeter-wave radar 211 is used, as well as in cases in which the front camera 221 is used, the forward target is often determined to be an upper object at a timing at which the distance d between the upper object St1 and the own vehicle M0 shortens.

Returning to the description regarding FIG. 6, when determined that the forward target of which the information has been acquired is associated with the movement-history present flag (Yes at step S110), the CPU 101 determines whether or not the forward target has the oncoming-vehicle history or is determined to be an upper object (step S112).

As described above, the relative speed |Vr| in relation to the own vehicle speed Vn decreases as the distance between the upper object St1 and the own vehicle M0 decreases, that is, the speed of the forward target that is the upper object St1 increases. As a result, the forward target may be erroneously determined to be a separating object. Therefore, even when the forward target is a moving object, accuracy of the determination result regarding whether the forward target is a moving object or a stationary object can be improved by taking into consideration whether or not the forward target has been determined to be an upper object with the passage of time, that is, as the distance between the forward target and the own vehicle decreases.

When determined that the forward target has the oncoming-object history or is determined to be an upper object (Yes at step S112), the CPU 101 proceeds to step S140 and does not set the forward target as the control-target vehicle. The CPU 101 then ends the present processing routine. If an oncoming vehicle or an upper object is set as the control-target vehicle, driving assistance control that is unnecessary in terms of preventing collision and the like is performed. Execution frequency of driving assistance increases and smooth driving of the own vehicle is inhibited.

When determined that the forward target does not have the oncoming-vehicle history or is not determined to be an upper object (No at step S112), the CPU 101 proceeds to step S130 and sets the forward target as the control-target vehicle. The CPU 101 then ends the present processing routine.

When determined that the forward target is not associated with the movement-history present flag (No at step S110), the CPU 101 proceeds to step S120. When determined that the forward target is associated with the FSN-history present flag (YES at step S120), the CPU 101 determines whether or not the forward target is determined to be an upper object (step S122).

In cases in which the distance between the forward target and the own vehicle is long, even when the forward target is an upper object, the forward target may be considered to be a vehicle and the data fusion process may be performed. The forward target may thereby be associated with the FSN-history present flag. Meanwhile, when the forward target is a true upper object, the forward target is determined to be an upper object by the above-described method as the distance between the forward target and the own vehicle decreases. The forward target is thereby associated with the upper-object determination flag.

When determined that the forward target is not associated with the upper-object determination flag (No at step S122), the CPU 101 proceeds to step S130 and sets the forward target as the control-target vehicle. The CPU 101 then ends the present processing routine.

When determined that the forward target is associated with the upper-object determination flag (Yes at step S122), the CPU 101 determines whether or not the data fusion process is being continued for the forward target (step S124). When the forward target is a true upper object, the accuracy of the pattern matching process improves as the distance between the forward target and the own vehicle decreases. An erroneous data fusion process tends to not be performed. However, when the forward target is not an upper object, that is, the forward target is a stationary vehicle, the accuracy of the pattern matching process improves as the distance between the target above and the own vehicle decreases. The fusion process tends to be performed.

Therefore, even when the forward target is determined to be an upper object, when determined that the data fusion process is being continued (FSN continued) at the time of the determination at step S124 (Yes at step S124), the CPU 101 determines that the forward target is a stationary vehicle. The CPU 101 proceeds to step S130 and sets the forward target as the control-target vehicle. The CPU 101 then ends the present processing routine.

When determined that the data fusion process is not being continued (No at step S124), the CPU 101 proceeds to step S140 and does not set the forward target as the control-target vehicle. The CPU 101 then ends the present processing routine.

As a result of the control-target vehicle setting apparatus 10 according to the second embodiment, even when the forward target has the movement history, the forward target is not set as the control-target vehicle when at least either of the forward target being an oncoming vehicle and the forward target being determined to be an upper object is established. Therefore, the driving assistance control is not performed for a forward target that is an oncoming vehicle or an upper object. Excessive execution of the driving assistance control can be suppressed.

As a result of the control-target vehicle setting apparatus 10 according to the second embodiment, even when the forward target has the FSN history, the forward target is not set as the control-target vehicle when the forward target is determined to be an upper object. In addition, even when the forward target is determined to be an upper object, the forward target is set as the control-target vehicle when the data fusion process is currently being continued.

Therefore, an upper object being set as the control-target vehicle and unnecessary driving assistance control being performed can be suppressed or prevented, even when the upper object is erroneously determined to be a stationary object and associated with the FSN-history present flag during the data fusion process.

In addition, the forward target can be set as the control-target vehicle when the data fusion process is currently being performed even when the distance between the forward target and the own vehicle shortens and the forward target is determined to be an upper object rather than a stationary vehicle. The driving assistance control can be performed for a forward target that is highly likely to be a stationary vehicle.

Third Embodiment

Figure 10:
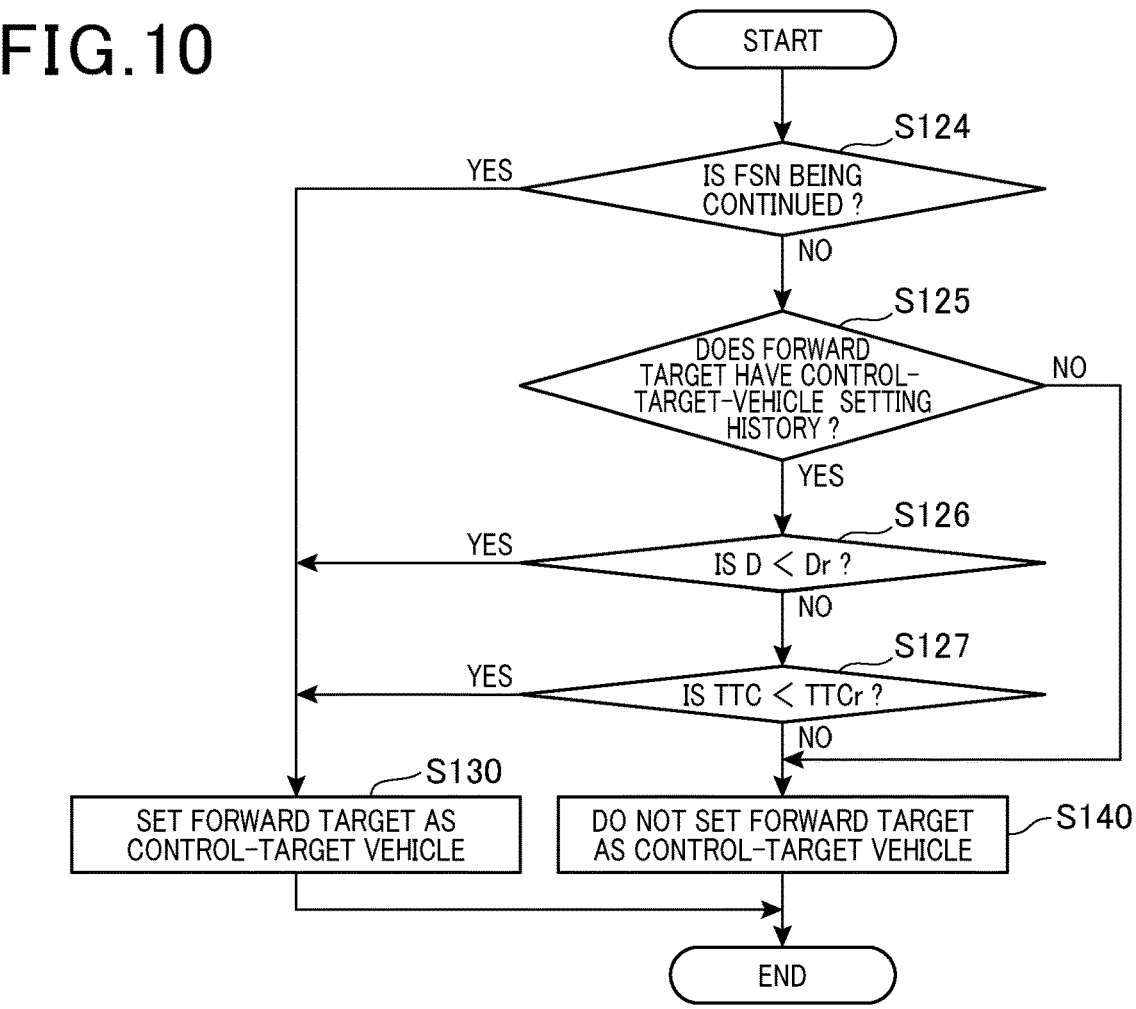
FIG. 10 is a flowchart of a processing flow of a control-target vehicle setting process according to a third embodiment.

A control-target vehicle setting process according to a third embodiment that is performed by the control-target vehicle setting apparatus 10 will be described with reference to FIG. 10.

The configurations of the vehicle 500, the control-target vehicle setting apparatus 10, and the control-target vehicle setting system are similar to the configurations according to the first embodiment and the second embodiment. Therefore, the configurations are given the same reference numbers. Descriptions thereof are omitted. In addition, processing steps similar to those of the control-target vehicle setting process according to the second embodiment are given the same step numbers. Descriptions thereof are omitted. The flowchart shown in FIG. 10 shows processing steps that may be additionally incorporated between step S124 and step S140 according to the second embodiment.

The CPU 101 performs step S124 in the flowchart shown in FIG. 6. When determined that the data fusion process is not being continued (No at step S124), the CPU 101 determines whether or not the forward target has a control-target-vehicle setting history that indicates that the forward target has been set as the control-target vehicle for an amount of time prescribed in advance or longer (step S125).

When the forward target has the FSN history and is determined to be an upper object, and the data fusion process is not being continued, the forward target should not be set as a target for driving assistance control. Meanwhile, when the forward target has been set as the control-target vehicle for a predetermined amount of time or longer, the behavior of the own vehicle may change as a result of the setting of the control-target vehicle being canceled.

In particular, when the distance between the forward target that is the control-target vehicle and the own vehicle decreases, the front camera 211 is no longer able to capture an image of the forward target. As a result, the CPU 101 can no longer continue the data fusion process. When the distance between the own vehicle and the control-target vehicle is short, the likelihood of deceleration control being performed as the driving assistance control is high. A sense of deceleration may be lost as a result of the deceleration control being canceled.

In addition, when ACC is performed as the driving assistance control, the own vehicle may accelerate. Therefore, when the forward target has the control-target-vehicle setting history, the forward target is set as the control-target vehicle based on a condition, even when the data fusion process is not being continued.

When determined that the forward target does not have the control-target-vehicle setting history (No at step S125), the CPU 101 proceeds to step S140 and does not set the forward target as the control-target vehicle. The CPU 101 then ends the present processing routine.

When determined that the forward target has the control-target-vehicle setting history (Yes at step S125), the CPU 101 determines whether or not a distance D between the forward target and the own vehicle is less than a distance threshold Dr (step S126). For example, the distance threshold Dr is a distance that allows no leeway for avoidance of a preceding vehicle through braking or steering by the driver. When determined that the distance D is less than the distance threshold Dr (Yes at step S126), the CPU 101 proceeds to step S130 and sets the forward target as the control-target vehicle. The CPU 101 then ends the present processing routine.

When determined that distance D is not less than the distance threshold Dr (No at step S126), the CPU 101 determines whether or not a time-to-collision (TTC) regarding the forward target is less than a determination threshold TTCr prescribed in advance. For example, the determination threshold TTCr prescribed in advance is an amount of time that allows no leeway for avoidance of a preceding vehicle through braking or steering by the driver.

When determined that the TTC is less than the determination threshold TTCr (Yes at step S127), the CPU 101 proceeds to step S130 and sets the forward target as the control-target vehicle. The CPU 101 then ends the present processing routine. When determined that the TTC is not less than the determination threshold TTCr (No at step S127), the CPU 101 proceeds to step S140 and does not set the forward target as the control-target vehicle. The CPU 101 then ends the present processing routine.

The determination regarding whether or not the distance D between the forward target and the own vehicle is less than the distance threshold Dr and the determination regarding whether or not the TTC regarding the forward target is less than the determination threshold TTCr may be comprehensively performed at a single processing step.

As a result of the control-target vehicle setting apparatus 10 according to the third embodiment, even when the data fusion process for the forward target is not being continued, the forward target can be set as the control-target vehicle based on the relationship between the forward target and the own vehicle when the forward target has the control-target-vehicle setting history.

More specifically, when at least either of the distance D between the forward target and the own vehicle being less than the distance threshold Dr and the TTC regarding the forward target being less than the determination threshold TTCr is determined, the forward target is set as the control-target vehicle. When this condition is not met, the forward target is not set as the control-target vehicle.

Therefore, uncertainty and discomfort experienced by the driver in accompaniment with the setting of the control-target vehicle being canceled and the driving assistance control based on the forward target being canceled can be reduced or eliminated. Meanwhile, when the forward target is that for which the data fusion process is not being continued and does not have the control-target setting history, the forward target can be excluded from the setting of the control-target vehicle and unnecessary execution of the driving assistance control can be suppressed or prevented.

Fourth Embodiment

Figure 11:
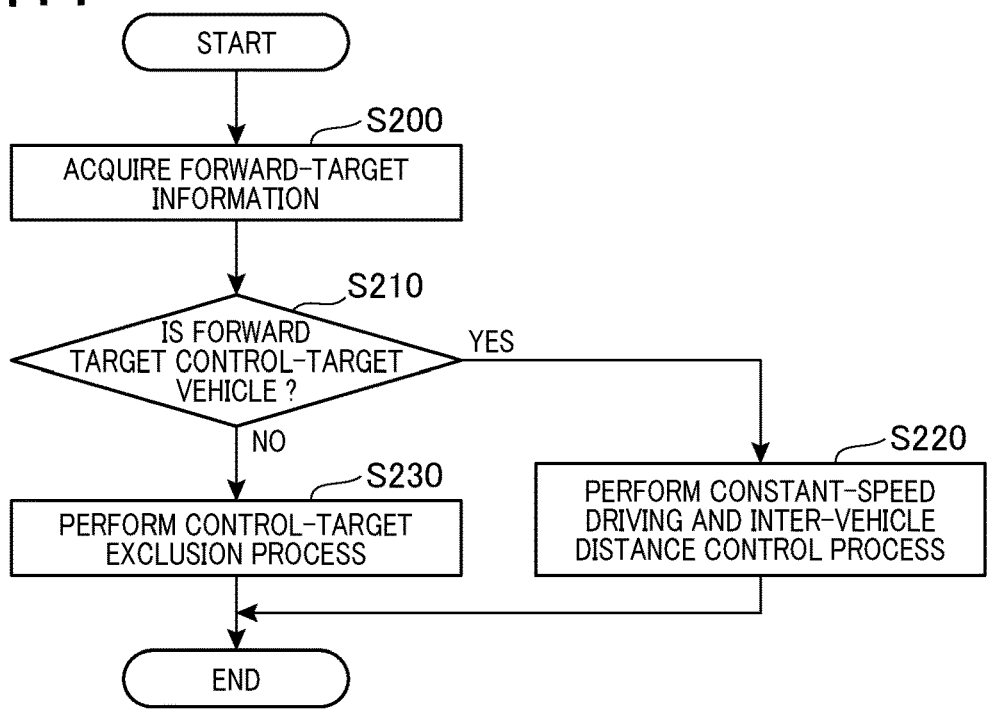
FIG. 11 is a flowchart of a processing flow of a control-target vehicle setting process according to a fourth embodiment.

A driving assistance control process according to a fourth embodiment will be described with reference to FIG. 11. The driving assistance control process is a detailed example of the driving assistance control process (step S20) shown in FIG. 3. A constant-speed driving and inter-vehicle distance control process (ACC) is performed. In addition, the driving assistance control process is performed by a control-target vehicle setting system including the control-target vehicle setting apparatus 10.

The CPU 101 acquires information on the forward target (step S200). The information on the forward target is so-called attribute information and is acquired through the radar ECU 21 and the camera ECU 22. The CPU 101 determines whether or not the forward target is the control-target vehicle using the acquired information (step S210). The control-target vehicle is also referred to as a preceding vehicle. Whether or not the forward target is the control-target vehicle may be determined by the mark that is associated with the forward target when the forward target is set as the control-target vehicle in the above-described control-target vehicle setting process.

When determined that the forward target is the control-target vehicle (Yes at step S210), the CPU 101 performs the constant-speed driving and inter-vehicle distance control process (step S220). The CPU 101 then ends the present processing routine.

The constant-speed driving and inter-vehicle distance control process is implemented by the CPU 101 that runs the driving assistance control program P2 transmitting a throttle-opening command signal to the throttle driving apparatus 31 to maintain a preset speed. In addition, the CPU 101 transmits a throttle-opening command signal to the throttle driving apparatus 31 to maintain an inter-vehicle distance set in advance and transmits a brake command signal to the brake assistance apparatus 32 to implement a required degree of deceleration. In addition, information indicating a driving state of the own vehicle that is inputted from the yaw rate sensor 23 and the wheel speed sensors 24 is also used.

When determined that the forward target is not the control-target vehicle (No at step S210), the CPU 101 performs a control-target exclusion process (step S230). The CPU 101 then ends the present processing routine.

For example, cases in which the forward target is excluded as the control-target vehicle includes cases in which the forward target that has been set as the control-target vehicle is determined to be an upper object and cases in which a control-target vehicle candidate that is closer to the own vehicle appears. For example, the control-target exclusion process includes a process in which deceleration is maintained when the own vehicle is decelerating as a result of the driving assistance control, and acceleration is suppressed when the own vehicle is accelerating.

As described above, the upper object may be determined to be a separating object because the relative speed thereof decreases as the distance to the own vehicle decreases. Therefore, when a faraway stationary vehicle starts to drive when approaching the own vehicle, the stationary vehicle may be erroneously recognized as being an upper object. Therefore, the above-described control-target exclusion process is performed to prevent collision or contact with the forward target that is actually a vehicle.

These processes are implemented by the CPU 101 continuing transmission of the brake command signal to the brake assistance apparatus 32, and transmitting a throttle-opening retention signal or a signal that instructs reduction of the throttle opening to the throttle driving apparatus 31. Alternatively, the control-target exclusion process includes a process in which the driving assistance control is canceled and control is returned to the driver.

As a result of the driving assistance control process according to the fourth embodiment, the control-target exclusion process is performed when the forward target is excluded as the control-target vehicle. Therefore, collision and contact between the forward target that is excluded as the control-target vehicle and the own vehicle can be reduced or prevented.

Other Embodiments (1) According to the first embodiment to the third embodiment, to facilitate description, the determination regarding whether the forward target is a moving object, a stationary object, an oncoming vehicle, or an upper object is performed and the forward target is associated with history information corresponding to the determination, when the attribute information of the forward target is acquired in the control-target vehicle setting process.

However, the process in which the type of the forward target is determined and the forward target is associated with the corresponding history information may be performed at a separate timing independent of the control-target vehicle setting process. In this case, at step S100 in the control-target vehicle setting process, the CPU 101 may retrieve the associated history information from the memory 102 based on the acquired attribute information of the forward target and use the history information at subsequent processing steps.

(2) According to the above-described embodiments, the setting control unit and the driving assistance control unit are implemented by software, as a result of the CPU 101 running the control-target vehicle setting program P1 and the driving assistance control program P2. However, the setting control unit and the driving assistance control unit may be implemented by hardware, through an integrated circuit or a discrete circuit programmed in advance.

The present disclosure is described above according to embodiments and variation examples. However, the above-described embodiments of the invention serve to facilitate understanding of the present disclosure and do not limit the present disclosure. The present disclosure may be modified and improved without departing from the spirit of the invention and the scope of claims.

In addition, the present disclosure includes equivalents thereof. For example, technical features according to the embodiments and variation examples that correspond to technical features according to aspects described in the summary of the invention may be substituted or combined as appropriate to solve the above-described issues in part or in its entirety, or to achieve the above-described effects in part or in its entirety. In addition, the technical features may be eliminated as appropriate unless described as being a requisite in the present specification.

For example, when the control-target vehicle setting apparatus of the vehicle according to the above-described first exemplary embodiment is an application example 1, the following application examples 2 to 9 are also possible.

Application Example 2

In a control-target vehicle setting apparatus that is the control-target vehicle setting apparatus described in the application example 1, the setting control unit does not set the forward target as the control-target vehicle when the forward target is determined to be an upper object above the driving road that is present above a driving road on which the own vehicle is driving after the forward target is determined to be a vehicle.

Application Example 3

In a control-target vehicle setting apparatus that is the control-target vehicle setting apparatus described in the application example 2, the setting control unit sets the forward target as the control-target vehicle when detection of the forward target using the first detection signal and the second detection signal in an integrated manner is continued, even when the forward target is determined to be an upper object above the driving road that is present above a driving road on which the own vehicle is driving.

Application Example 4

In a control-target vehicle setting apparatus that is the control-target vehicle setting apparatus described in any one of the application examples 1 to 3, the setting control unit sets the forward target as the control-target vehicle when at least either of the distance between the forward target and the own vehicle being less than the distance threshold and the time-to-collision regarding the forward target being less than the determination threshold is determined when the forward target is not associated with an integration history, detection of the forward target using the first detection signal and the second detection signal in an integrated manner is not continued, and the forward target is associated with a control-target-vehicle setting history that indicates that the forward target has been set as the control-target vehicle.

Application Example 5

In a control-target vehicle setting apparatus that is the control-target vehicle setting apparatus described in the application example 4, the setting control unit does not set the forward target as the control-target vehicle when the forward target does not have the integration history, detection of the forward target using the first detection signal and the second detection signal in an integrated manner is not continued, and the forward target is not associated with the control-target-vehicle setting history.

Application Example 6

In a control-target vehicle setting apparatus that is the control-target vehicle setting apparatus described in any one of the application examples 1 to 5, the setting control unit does not set the forward target as the control-target vehicle when at least either of the forward target being associated with an oncoming vehicle history that indicates that the forward target has been determined to be an oncoming vehicle and the forward target being determined to be an upper object on the driving road is established, even when the forward target is associated with the movement history.

Application Example 7

A control-target vehicle setting system includes the control-target vehicle setting apparatus in any one of the application examples 1 to 6, a first detecting unit that outputs the first detection signal, and a second detecting unit that outputs the second detection signal.

Application Example 8

A control-target vehicle setting system that is the control-target vehicle setting system in the application example 7 further includes a driving assistance control unit that performs a constant-speed driving and inter-vehicle distance control process as the driving assistance control based on the set control-target vehicle. The driving assistance control unit maintains deceleration when the own vehicle is decelerating, suppresses acceleration when the own vehicle is accelerating, or cancels the constant-speed driving and inter-vehicle distance control process, when the control-target vehicle for which the constant-speed driving and inter-vehicle distance control process is performed is changed from the control-target vehicle to a non-control-target vehicle.

Application Example 9

A target preceding vehicle setting apparatus sets a target preceding vehicle (control-target vehicle) for driving assistance control of an own vehicle. The target preceding vehicle setting apparatus includes a detection signal acquiring unit and a setting control unit. The detection signal acquiring unit acquires a first detection signal that indicates a forward object (target) by an image and a second detection signal that indicates the forward object by a reflection point. The setting control unit sets the forward object as the target preceding vehicle when the forward object has been determined to be a vehicle based on the first detection signal and the second detection signal, even when the forward object is not associated with a movement history.

What is claimed is:

1. A control-target vehicle setting apparatus comprising:
   a detection signal acquiring unit configured to acquire a first detection signal that indicates a target by an image and a second detection signal that indicates a target by a reflection point; and
   a setting control unit configured to:
      determine that an identified forward target is stationary in response to the forward target not being associated with a movement history;
      differentiate, in addition to being determined to be stationary, the forward target as a stationary vehicle instead of a stationary object other than a vehicle, wherein the forward target is differentiated as the stationary vehicle in response to the forward target being associated with an integration history that indicates that the forward target has been determined to be a vehicle using the first detection signal and the second detection signal in an integrated manner; and
      set the forward target as a control target vehicle that serves as a target for driving assistance control in response to the forward target being differentiated as a stationary vehicle.

2. The control-target vehicle setting apparatus according to claim 1, wherein:
   the setting control unit is further configured to not set the forward target as the control-target vehicle in response to the forward target being determined to be an upper object that is present above a driving road on which an own vehicle is driving after the forward target is determined to be a vehicle.

3. The control-target vehicle setting apparatus according to claim 2, wherein:
   the setting control unit is configured to set the forward target as the control-target vehicle in response to detection of the forward target using the first detection signal and the second detection signal in an integrated manner being continued, even when the forward target is determined to be an upper object that is present above the driving road on which an own vehicle is driving.

4. The control-target vehicle setting apparatus according to claim 3, wherein:
   the setting control unit is configured to set the forward target as the control-target vehicle in response to at least one of: a distance between the forward target and an own vehicle being less than a distance threshold and a time-to-collision regarding the forward target being less than a determination threshold is determined when the forward target is not associated with the integration history, detection of the forward target using the first detection signal and the second detection signal in an integrated manner is not continued, or the forward target is associated with a control-target-vehicle setting history that indicates that the forward target has been set as the control-target vehicle.

5. The control-target vehicle setting apparatus according to claim 3, wherein:
   the setting control unit is configured to not set the forward target as the control-target vehicle in response to at least one of: the forward target being associated with an oncoming vehicle history that indicates that the forward target has been determined to be an oncoming vehicle or the forward target being determined to be an upper object on the driving road is established, even when the forward target is associated with the movement history.

6. The control-target vehicle setting apparatus according to claim 2, wherein:
the setting control unit is configured to set the forward target as the control-target vehicle in response to at least one of: a distance between the forward target and an own vehicle being less than a distance threshold and a time-to-collision regarding the forward target being less than a determination threshold is determined when the forward target is not associated with the integration history, detection of the forward target using the first detection signal and the second detection signal in an integrated manner is not continued, or the forward target is associated with a control-target-vehicle setting history that indicates that the forward target has been set as the control-target vehicle.

7. The control-target vehicle setting apparatus according to claim 2, wherein:
the setting control unit is configured to not set the forward target as the control-target vehicle in response to at least one of: the forward target being associated with an oncoming vehicle history that indicates that the forward target has been determined to be an oncoming vehicle or the forward target being determined to be an upper object on the driving road is established, even when the forward target is associated with the movement history.

8. The control-target vehicle setting apparatus according to claim 1, wherein:
the setting control unit is configured to set the forward target as the control-target vehicle in response to at least one of: a distance between the forward target and an own vehicle being less than a distance threshold and a time-to-collision regarding the forward target being less than a determination threshold is determined when the forward target is not associated with the integration history, detection of the forward target using the first detection signal and the second detection signal in an integrated manner is not continued, or the forward target is associated with a control-target-vehicle setting history that indicates that the forward target has been set as the control-target vehicle.

9. The control-target vehicle setting apparatus according to claim 8, wherein:
the setting control unit is configured to not set the forward target as the control-target vehicle in response to: the forward target not having the integration history, detection of the forward target using the first detection signal and the second detection signal in an integrated manner is not continued, and the forward target is not associated with the control-target-vehicle setting history.

10. The control-target vehicle setting apparatus according to claim 8, wherein:
the setting control unit is configured to not set the forward target as the control-target vehicle in response to at least one of: the forward target being associated with an oncoming vehicle history that indicates that the forward target has been determined to be an oncoming vehicle or the forward target being determined to be an upper object on the driving road is established, even when the forward target is associated with the movement history.

11. The control-target vehicle setting apparatus according to claim 1, wherein:
the setting control unit is configured to not set the forward target as the control-target vehicle in response to at least one of: the forward target being associated with an oncoming vehicle history that indicates that the forward target has been determined to be an oncoming vehicle or the forward target being determined to be an upper object on a driving road is established, even when the forward target is associated with the movement history.

12. A control-target vehicle setting system comprising:
a control-target vehicle setting apparatus that comprises:
a detection signal acquiring unit configured to acquire a first detection signal that indicates a target by an image and a second detection signal that indicates a target by a reflection point, and
a setting control unit configured to:
determine that an identified forward target is stationary in response to the forward target not being associated with a movement history;
differentiate, in addition to being determined to be stationary, the forward target as a stationary vehicle instead of a stationary object other than a vehicle, wherein the forward target is differentiated as the stationary vehicle in response to the forward target being associated with an integration history that indicates that the forward target has been determined to be a vehicle using the first detection signal and the second detection signal in an integrated manner; and
set the forward target as a control target vehicle that serves as a target for driving assistance control in response to the forward target being differentiated as a stationary vehicle;
a first detecting unit configured to output the first detection signal; and
a second detecting unit configured to output the second detection signal.

13. The control-target vehicle setting system according to claim 12, further comprising:
a driving assistance control unit configured to perform a constant-speed driving and inter-vehicle distance control process as the driving assistance control based on the set control-target vehicle, wherein
the driving assistance control unit maintains deceleration when an own vehicle is decelerating, suppresses acceleration when the own vehicle is accelerating, or cancels the constant-speed driving and inter-vehicle distance control process, when the control-target vehicle for which the constant-speed driving and inter-vehicle distance control process is performed is changed from the control-target vehicle to a non-control-target vehicle.

14. A control-target vehicle setting method comprising:
acquiring a first detection signal that indicates a target by an image and a second detection signal that indicates a target by a reflection point;
determining that an identified forward target is stationary in response to the forward target not being associated with a movement history;
differentiating, in addition to being determined to be stationary, the forward target as a stationary vehicle instead of a stationary object other than a vehicle, wherein the forward target is differentiated as the stationary vehicle in response to the forward target being associated with an integration history that indicates that the forward target has been determined to be a vehicle using the first detection signal and the second detection signal in an integrated manner; and setting the forward target as a control-target vehicle that serves as a target for driving assistance control in response to the forward target being differentiated as a stationary vehicle.

\* \* \* \* \*